March 14, 1967  ÅKE S. GIDLUND  3,308,812
DEVICE FOR OSTEOSYNTHESIS
Filed May 27, 1964
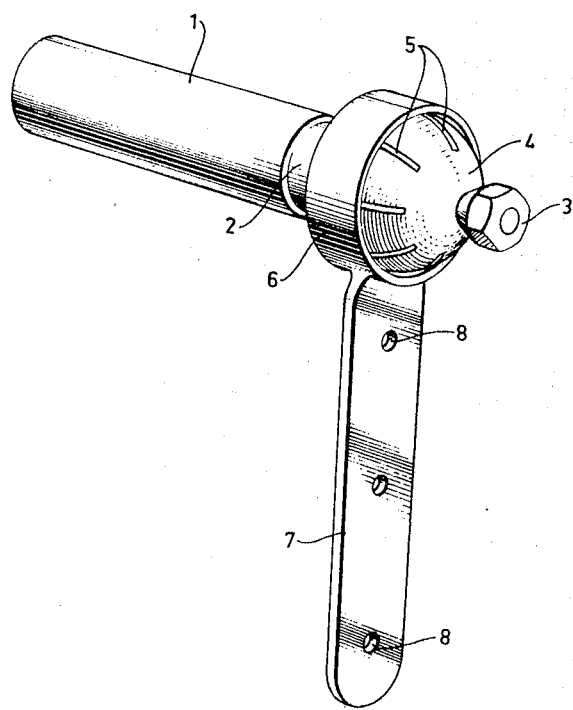

United States Patent Office 3,308,812
Patented Mar. 14, 1967

3,308,812
DEVICE FOR OSTEOSYNTHESIS
Åke Samuel Gidlund, Lokevagen 13, Djursholm, Sweden
Filed May 27, 1964, Ser. No. 370,428
1 Claim. (Cl. 128—92)

The invention relates to a device for osteosynthesis comprising a pin having a supporting member or arm. The device is used in bone fractures for keeping the injured parts fixed so that healing can take place. The invention relates particularly to a so-called collum nail which is to be introduced into the neck of the femur (thigh bone), when this neck has been fractured and which is provided with a supporting member to be fastened to the thigh bone. Although the following description entirely relates to such a collum nail the invention involves every kind of pins for osteosynthesis provided with a supporting member.

In order to get a good contact between the supporting member and the femur it is desirable that in each special case the angle between the pin and the supporting member or arm can be adjusted. For this purpose one has previously provided the end of the supporting arm with a bow-shaped part. By fastening the pin to a suitable portion of this bow one has been able to vary said angle within certain limits. This known device, however, is rather clumsy and the angle cannot be varied very much. Another disadvantage of the known device is that the supporting member or arm could not be turned around its own axis.

The invention relates to a pin having a supporting arm which requires very little space and which can be moved within wide limits. The supporting arm can be fixed in the desired angle to the pin within a wide range and it can be turned around its own axis. The device according to the invention is characterized in that the pin and the supporting member are joined by means of a ball joint provided with a locking device for fixing the pin and the supporting member in the desired position relative to each other.

The locking device for the ball joint can be designed in different ways. For instance, the socket surrounding the ball proper can be drawn tight so as to press round the ball with a sufficient pressure. Usually, however, one desires to fix the supporting arm to the pin after the pin has been introduced into the neck of the femur. It is difficult to draw the outer socket tight after the pin has been thus introduced. Instead, it is desired to have a locking device which can be easily handled from the outside, preferably by means of a socket-wrench. This is achieved by the embodiment of the invention illustrated on the accompanying drawing.

The illustrated device comprises a collum pin 1 of any desired cross-section. One end of the pin has a conical portion 2 having a threaded end portion on which there is screwed a nut 3. On the conical portion 2 of the pin there is fitted a ball 4 having a conical boring corresponding to the shape of portion 2. The ball 4 is provided with at least two slits 5 extending from the wider end of the conical boring towards but not completely up to the smaller end of said boring. The ball 4 thereby becomes expansible and can be expanded by being forced against the wider end of the conical part 2 by means of the nut 3. The ball 4 is surrounded by a ring-shaped socket 6 secured to a supporting member or arm 7 having holes 8. For the purpose of a good locking between the ball 4 and the socket 6 the outer surface of the ball and the inner surface of the socket should not be quite smooth but shall preferably be finished in a way producing a rough surface.

The illustrated device is used in the following manner. The device is taken apart and the pin 1 is introduced into the neck of the femur in a manner known per se. The ball 4 mounted in the socket 6 is placed on the conical portion 2 and the supporting arm 7 is adjusted so as to fit upon the femur. The nut 3 is threaded on the top and is drawn so tight as to produce the desired locking between the ball 4 and the socket 6. The supporting arm 7 is fixed to the femur in a known manner by means of screws, pins or nails inserted into the femur through the holes 8.

What is claimed is:
A device for osteosynthesis comprising a pin having a conical end portion terminating in a threaded end, a hollow ball fitted over the threaded end of said pin and having its internal surface engaged with the conical end portion thereof, said ball being provided with a plurality of spaced longitudinal slits to render it expansible, a socket ring tightly surrounding said ball and provided with a laterally extending supporting member and a clamping nut threadably engaged on the threaded end of said pin for securely clamping said ball against the conical end portion of said pin and simultaneously expanding said ball into locked engagement within said socket ring.

References Cited by the Examiner
UNITED STATES PATENTS 2,397,545 4/1946 Hardinge _____ 128—92
2,947,308 8/1960 Gorman _____ 128—92

FOREIGN PATENTS 1,130,111 5/1962 Germany.

RICHARD A. GAUDET, *Primary Examiner.*
J. W. HINEY, Jr., *Assistant Examiner.*